(12) United States Patent
Weast et al.

(10) Patent No.: US 10,225,972 B2
(45) Date of Patent: Mar. 12, 2019

(54) WINGED CHISEL

(71) Applicant: KUHN KRAUSE, INC., Hutchinson, KS (US)

(72) Inventors: David H. Weast, Buhler, KS (US); Rodney L. Hagman, Buhler, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 24 days.

(21) Appl. No.: 15/671,961

(22) Filed: Aug. 8, 2017

(65) Prior Publication Data

US 2019/0045698 A1  Feb. 14, 2019

(51) Int. Cl.
*A01B 15/02* (2006.01)
*A01B 76/00* (2006.01)

(52) U.S. Cl.
CPC .............. *A01B 15/02* (2013.01); *A01B 76/00* (2013.01)

(58) Field of Classification Search
CPC ........ A01B 15/02; A01B 35/26; E02F 9/2858
USPC ................... 172/699, 713, 730, 765; D15/29
See application file for complete search history.

(56) References Cited

U.S. PATENT DOCUMENTS

| 482,226 | A | * | 9/1892 | Cheney et al. | ........ | A01B 15/02 172/743 |
|---|---|---|---|---|---|---|
| 774,324 | A | | 11/1904 | Hill et al. | | |
| 1,330,812 | A | | 2/1920 | Lilly | | |
| D279,476 | S | | 7/1985 | Nja | | |
| D285,691 | S | | 9/1986 | Johnson | | |
| 4,794,992 | A | | 1/1989 | Loch | | |
| 4,911,249 | A | | 3/1990 | Mitchell | | |
| D328,466 | S | | 8/1992 | Robinson | | |
| D329,243 | S | | 9/1992 | Robinson | | |
| 5,165,487 | A | | 11/1992 | Williams et al. | | |
| D345,364 | S | | 3/1994 | Robinson | | |
| D354,291 | S | | 1/1995 | Edwards | | |
| D360,420 | S | | 7/1995 | Woodward et al. | | |
| 5,499,686 | A | | 3/1996 | Parker | | |
| 5,579,852 | A | | 12/1996 | Woodward et al. | | |
| 5,605,196 | A | | 2/1997 | Grimm et al. | | |
| D411,546 | S | | 6/1999 | Chapman | | |
| D415,173 | S | | 10/1999 | Zaun | | |
| D429,256 | S | | 8/2000 | Zaun | | |
| D429,257 | S | | 8/2000 | Zaun | | |
| D429,258 | S | | 8/2000 | Zaun | | |
| 6,443,237 | B1 | | 9/2002 | Myers et al. | | |

(Continued)

FOREIGN PATENT DOCUMENTS

| JP | 2010-94038 A | 4/2010 |
|---|---|---|
| JP | 2016-111998 A | 6/2016 |

(Continued)

OTHER PUBLICATIONS

International Search Report and Written Opinion dated Sep. 18, 2018 in PCT/US2018/38221, 12 pages.

*Primary Examiner* — Gary S Hartmann
(74) *Attorney, Agent, or Firm* — Oblon, McClelland, Maier & Neustadt, L.L.P.

(57) ABSTRACT

A chisel point to shatter compacted soil having a nose that penetrates the soil, a tail that points in an upward direction, a head that extends in a downstream direction from the nose, a body that connects the head to the tail in the downward direction and in the upward direction, and a pair of wings that laterally protrudes from the body in the downstream direction and in a downward direction.

15 Claims, 10 Drawing Sheets

(56) References Cited

U.S. PATENT DOCUMENTS

| | | | |
|---|---|---|---|
| D505,137 S | 5/2005 | Steinlage et al. | |
| D512,078 S | 11/2005 | Poutre | |
| 7,104,341 B2 | 9/2006 | Steinlage et al. | |
| 7,114,272 B2 * | 10/2006 | Clendenning | E02F 9/2841 37/452 |
| D560,691 S | 1/2008 | Launder et al. | |
| D615,998 S | 5/2010 | Kovach et al. | |
| D626,974 S | 11/2010 | Barber | |
| 8,087,471 B2 | 1/2012 | Kovach et al. | |
| 8,646,544 B2 | 2/2014 | Ingersoll | |
| D727,979 S | 4/2015 | Renski et al. | |
| D766,335 S | 9/2016 | Sanderson et al. | |
| 9,699,947 B2 * | 7/2017 | Wendte | A01B 35/20 |
| 2010/0326683 A1 | 12/2010 | Kovach et al. | |
| 2015/0271984 A1 | 10/2015 | Maenle | |
| 2016/0157410 A1 * | 6/2016 | Balvanz | A01B 15/025 172/699 |
| 2017/0055427 A1 | 3/2017 | Balvanz et al. | |
| 2017/0196159 A1 | 7/2017 | Carbaugh et al. | |
| 2017/0325392 A1 * | 11/2017 | Essig | A01B 23/02 |

FOREIGN PATENT DOCUMENTS

| | | |
|---|---|---|
| WO | 95/31089 A1 | 11/1995 |
| WO | 96/03023 A1 | 2/1996 |

* cited by examiner

Fig. 3G

# WINGED CHISEL

BACKGROUND

Field of the Disclosure

The present disclosure relates to a ground engagement or soil tillage tool. More precisely, the present application relates to chisel points used to penetrate and break up soil.

Description of the Related Art

In today's agriculture, due to the use of heavy machinery, e.g., tractors, trucks, and/or agricultural tools, a compaction layer that restricts plant growth may be formed beneath the soil surface due to loads exerted on the soil by the heavy machinery.

Such a demand in reducing soil compaction can be addressed by shattering and/or breaking down the compaction layer.

To this end, conventional soil preparation tools that can work the soil in depth, e.g., plows, or in surface, e.g., chisel points, to shatter and/or break down the compaction layer have been employed. Although such conventional soil preparation tools are widely used, they present important drawbacks. On one hand, conventional in-depth soil preparation tools may be able to break the compaction layer, but may be expensive to acquire and to operate as they require high horsepower tractors to be pulled through the compaction layer. On the other hand, conventional in-surface soil preparation tools may be less expensive to acquire and operate, but may be limited in breaking the compaction layer and providing adequate soil preparation.

Thus, a soil preparation tool solving the aforementioned problems of efficiency and cost of operation is needed.

SUMMARY

Accordingly, the object of the present disclosure is to provide a chisel point which overcomes the above-mentioned limitations.

The chisel point of the present disclosure provides adequate compaction reduction while limiting cost of operation by relying on hydrodynamic features, e.g., raised nose, grooves, and/or wings, that limit drag generated by the soil on the chisel point while enhancing penetration of the chisel point into the soil.

In one non-limiting illustrative example, a chisel point is presented. The chisel point includes a nose that penetrates the soil, a tail that points in an upward direction, a head that extends in a downstream direction from the nose, a body that connects the head to the tail in the downward direction and in the upward direction, and a pair of wings that laterally protrudes from the body in the downstream direction and in a downward direction.

In another non-limiting illustrative example, a chisel point assembly is presented. The chisel point assembly includes a tool assembly, a plurality of shanks affixed to the tool assembly, and a plurality of chisel points affixed to the plurality of shanks. Each chisel point of the plurality of chisel point has a nose that penetrates the soil, a tail that points in an upward direction, a head that extends in a downstream direction from the nose, a body that connects the head to the tail in the downward direction and in the upward direction, and a pair of wings that laterally protrudes from the body in the downstream direction and in a downward direction.

DETAILED DESCRIPTION

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise.

Figure 1:
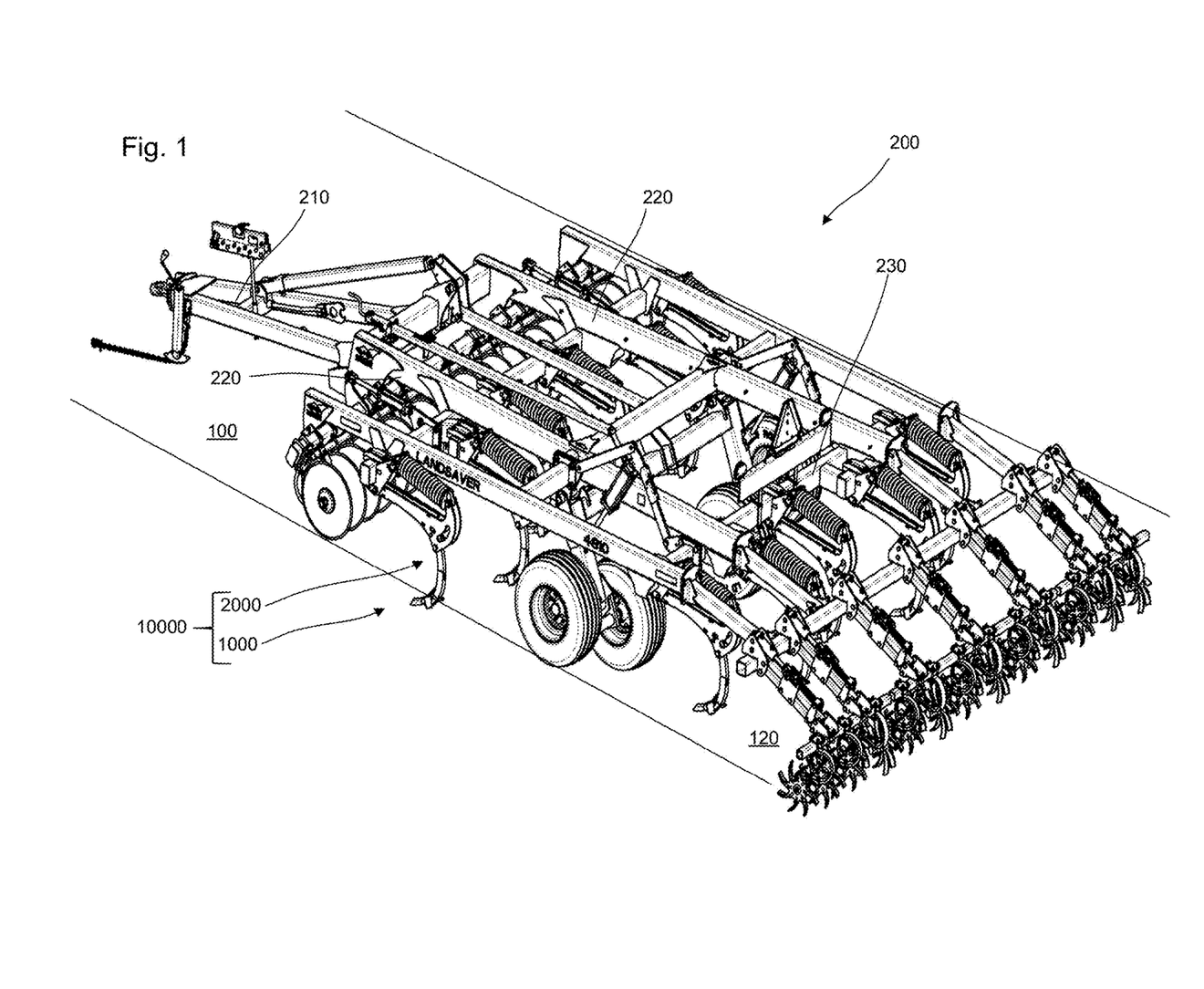
FIG. 1 is a perspective view of a plurality of chisel points mounted on an agricultural tool assembly, according to certain aspects of the disclosure.

FIG. 1 is a perspective view of a plurality of chisel points 1000 mounted on an agricultural tool assembly 200, according to certain aspects of the disclosure.

The agricultural tool assembly 200 can include a front support member 210 that connects to a tractor, a back support member 230 opposite to the front support member 210, longitudinal supports members 220 extending between the front support member 210 and the back support member 230 to support a chisel assembly 10000.

The agricultural tool assembly 200 goes over a material 100, e.g., soil that has been compacted due heavy machinery wheel traffic, to produce a prepared material 120, e.g., soil that has been shattered, loosened, and/or aerated.

The tillage tool 200 can include a plurality of chisel points 1000 that works the material 100 and a plurality of shanks 2000 that connects the plurality of chisel points 1000 to the back support member 230 and generate a bias force on the plurality of chisel points that pushes the plurality of chisel points 1000 against the unprepared material 100.

To efficiently reduce compaction of the unprepared materials 100, each chisel point of the plurality of chisel points 1000 relies on hydrodynamic features, e.g., nose profile, head curvature shape, and wing orientation, that reduce draft generated on the chisel point 1000 by promoting penetration and flow of the chisel point 1000 through the material 100 and break up of unprepared materials 100.

The reduction of draft provided by the chisel point 1000 can reduce time and energy consumption by requiring less power to pull the agricultural tool assembly 200 as well as by increasing the number of chisel points 1000 used in the agricultural tool.

Figure 2A:
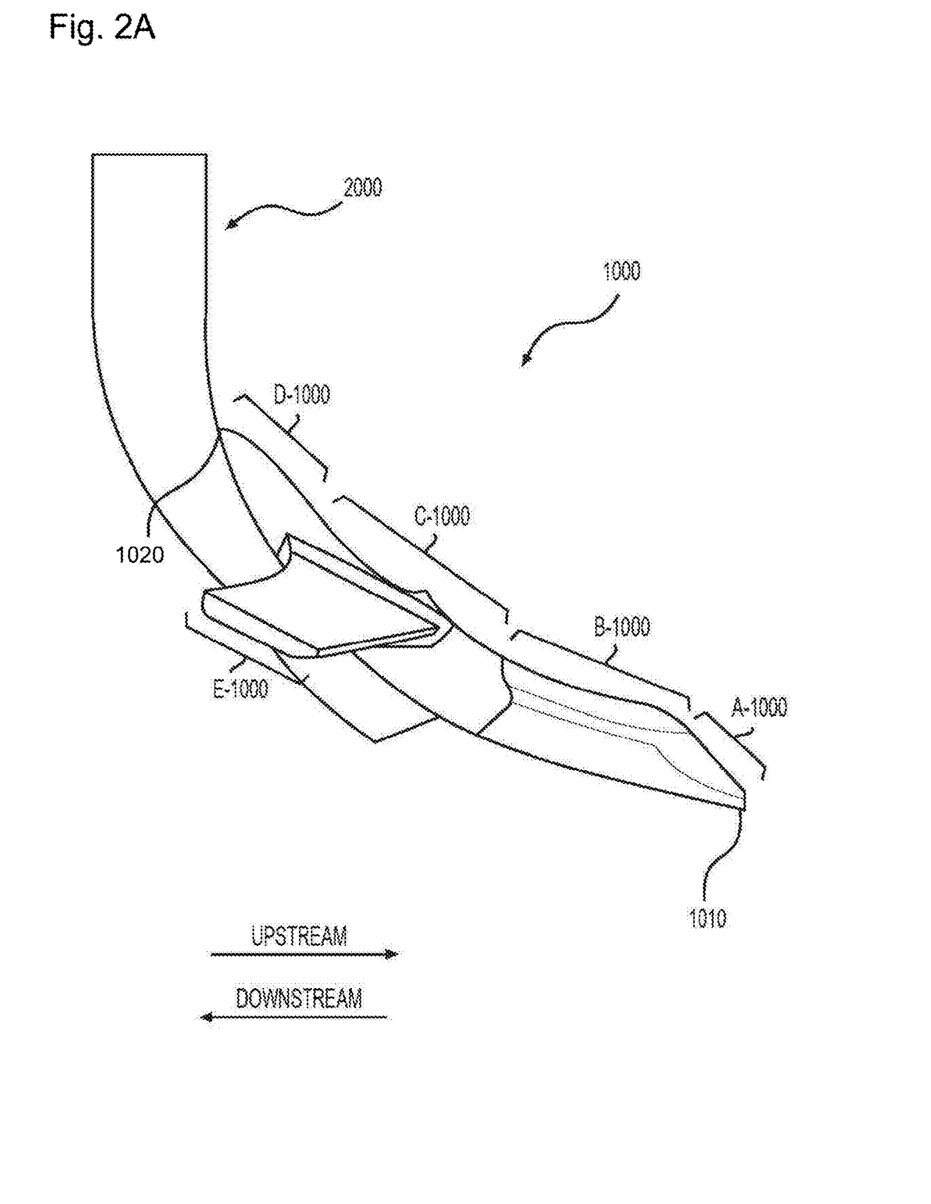
FIG. 2A is a side view of a chisel point of the plurality of chisel points mounted on a shank, according to certain aspect of the disclosure.
Figure 2B:
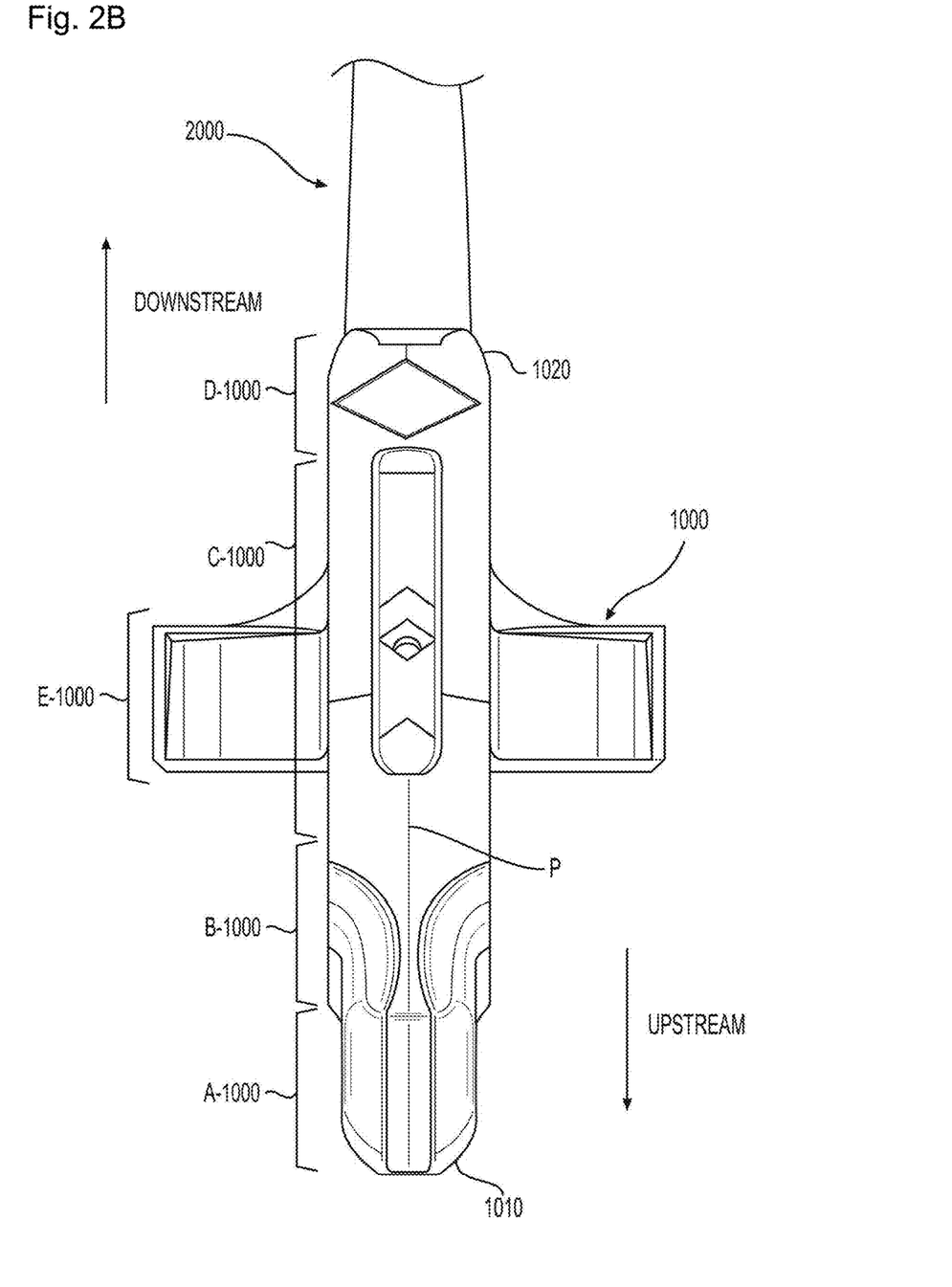
FIG. 2B is a front view of the chisel point mounted on the shank, according to certain aspect of the disclosure.
Figure 3A:
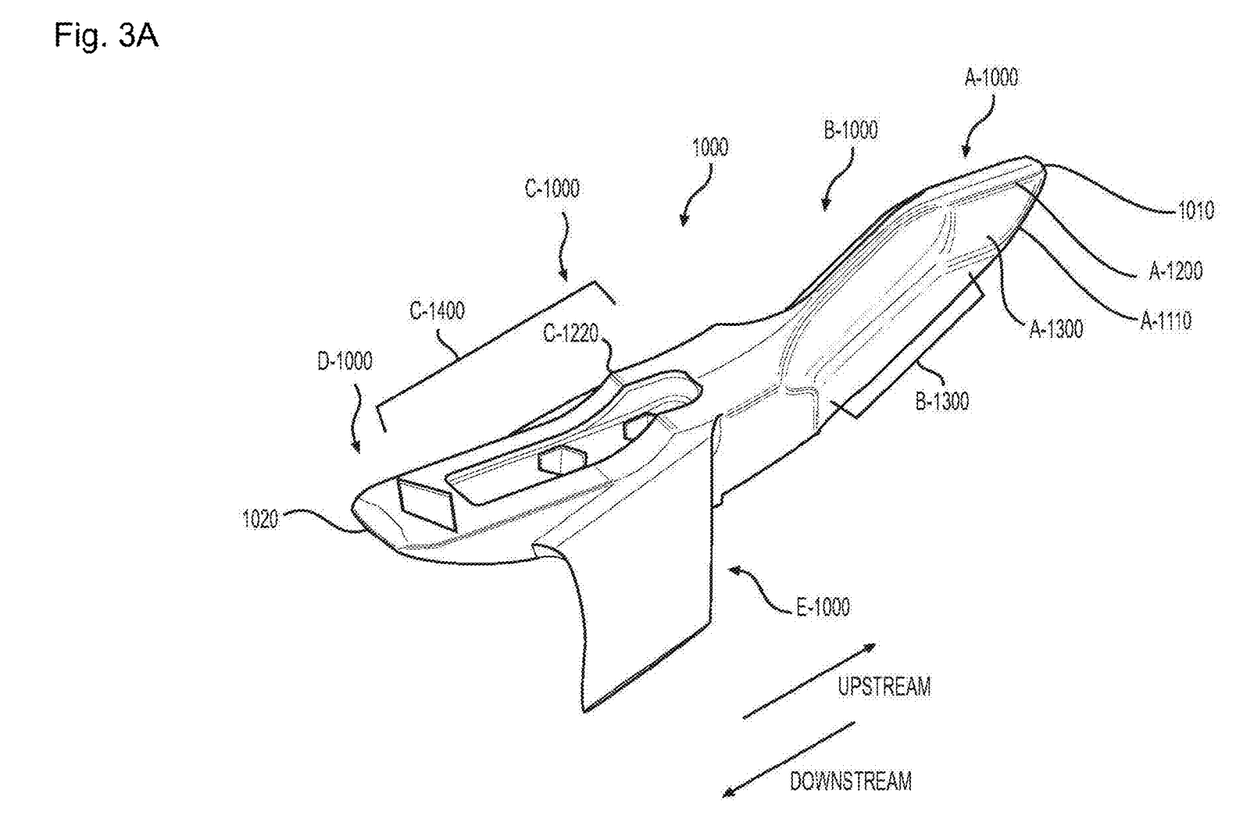
FIG. 3A is a perspective view of the chisel point, according to certain aspects of the disclosure.
Figure 3B:
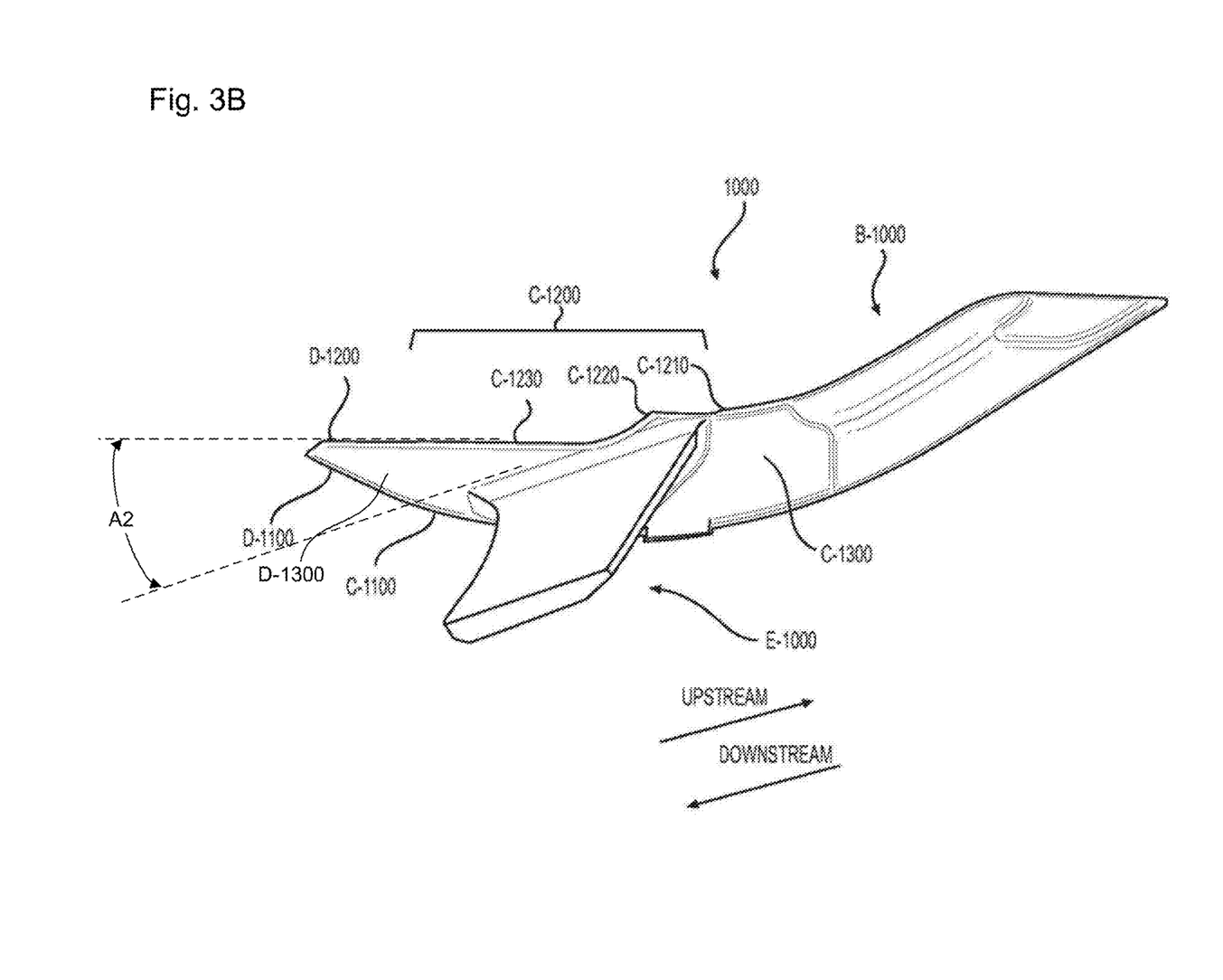
FIG. 3B is a side view of the chisel point, according to certain aspects of the disclosure.
Figure 3C:
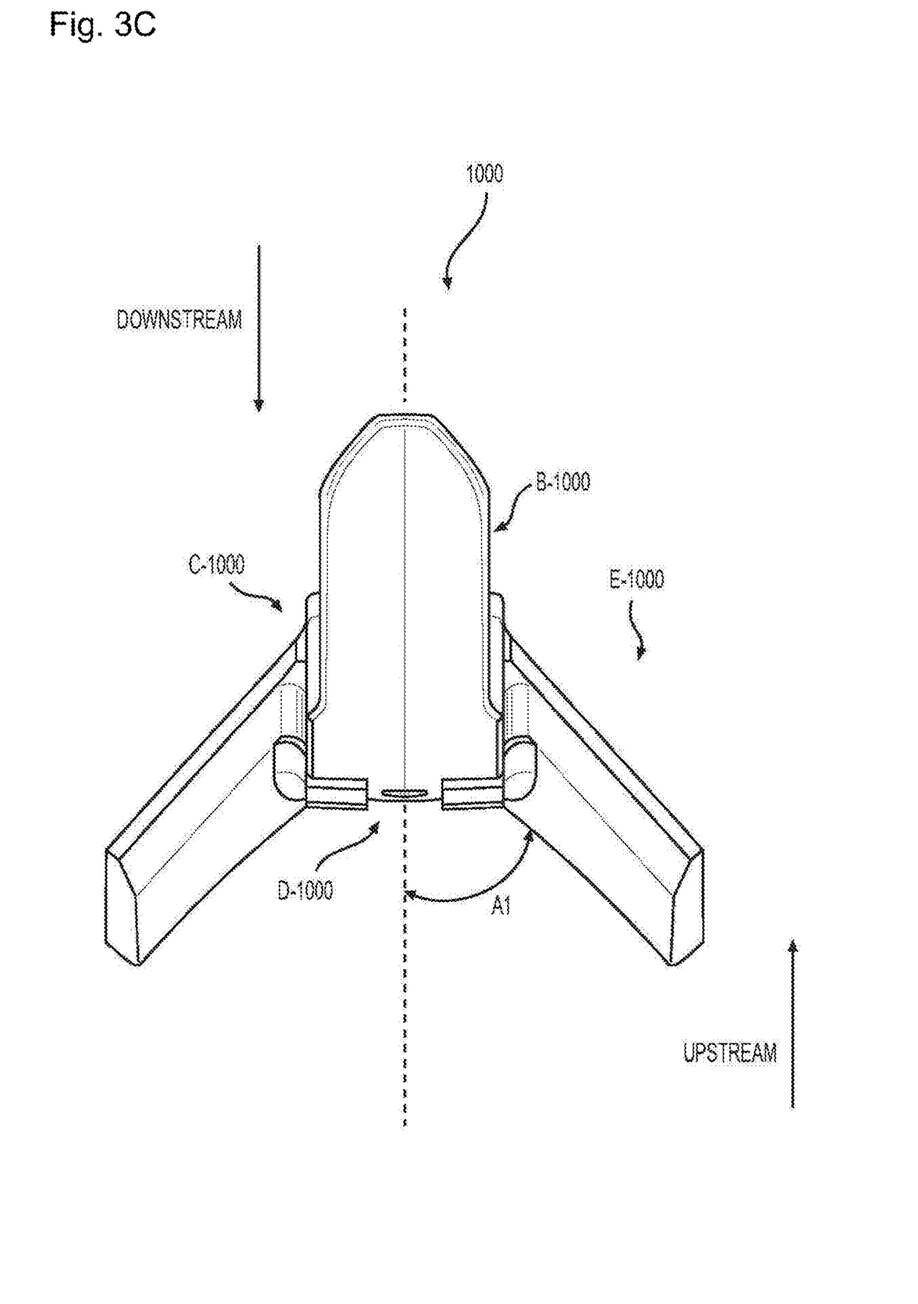
FIG. 3C is a bottom view of the chisel point, according to certain aspects of the disclosure.
Figure 3D:
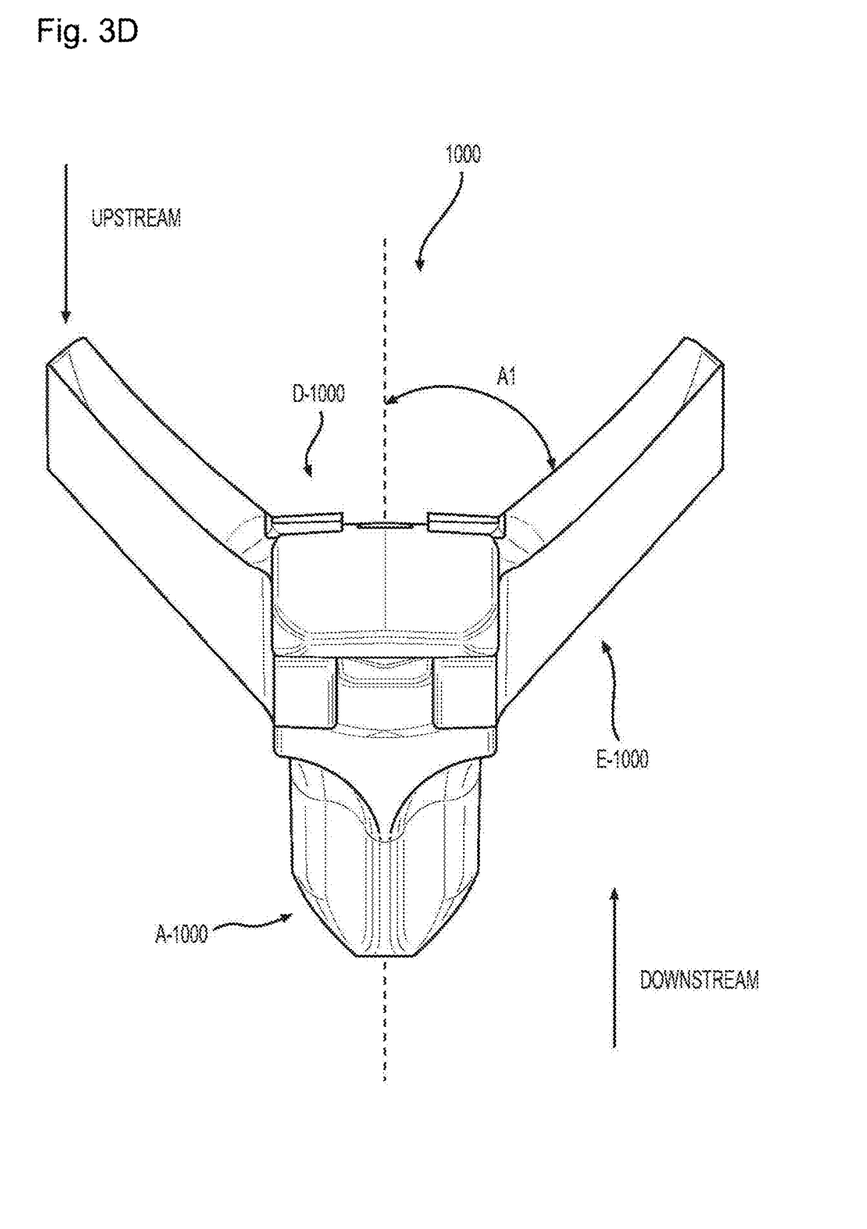
FIG. 3D is a top view of the chisel point, according to certain aspects of the disclosure.
Figure 3E:
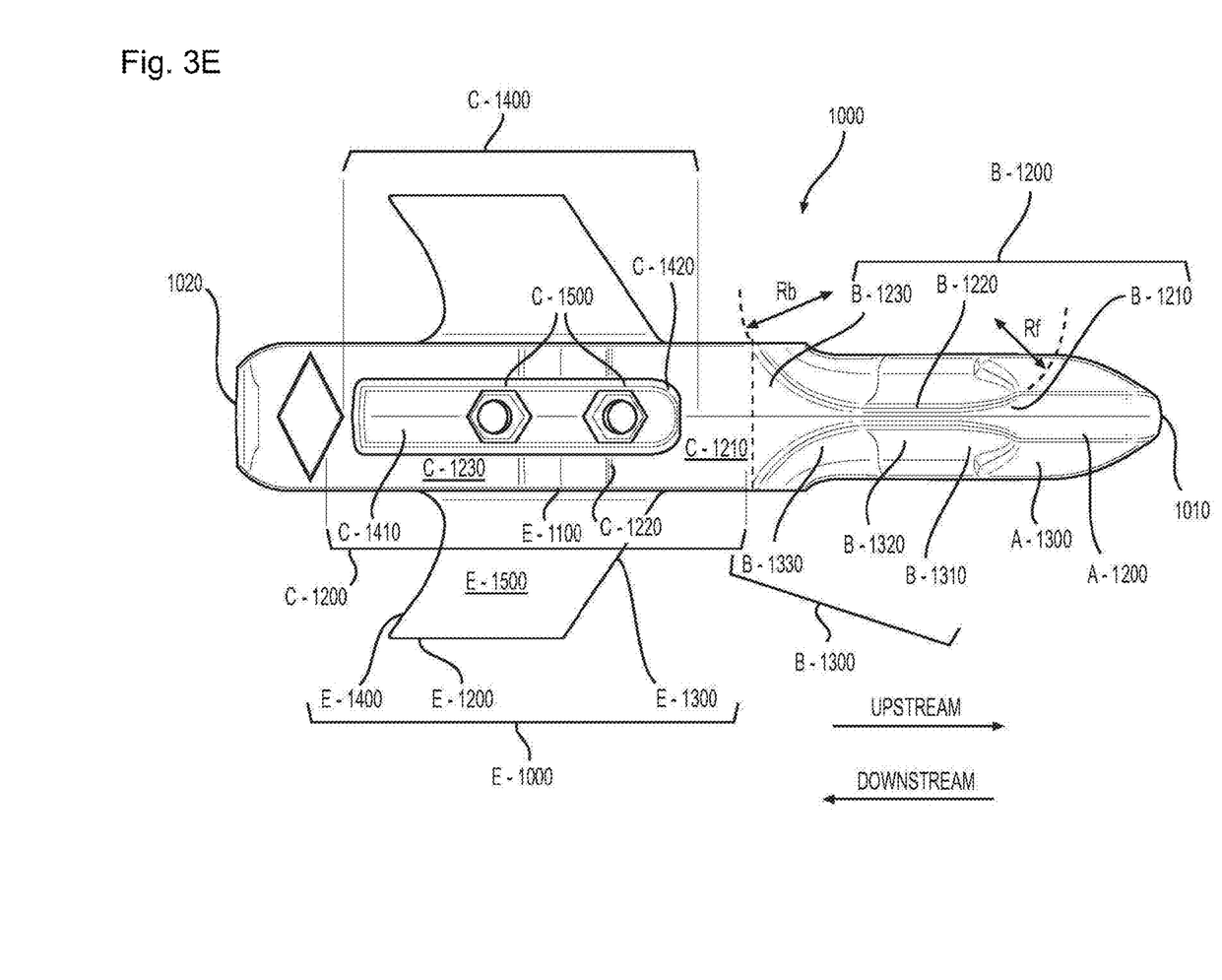
FIG. 3E is a front view of the chisel point, according to certain aspects of the disclosure.
Figure 3F:
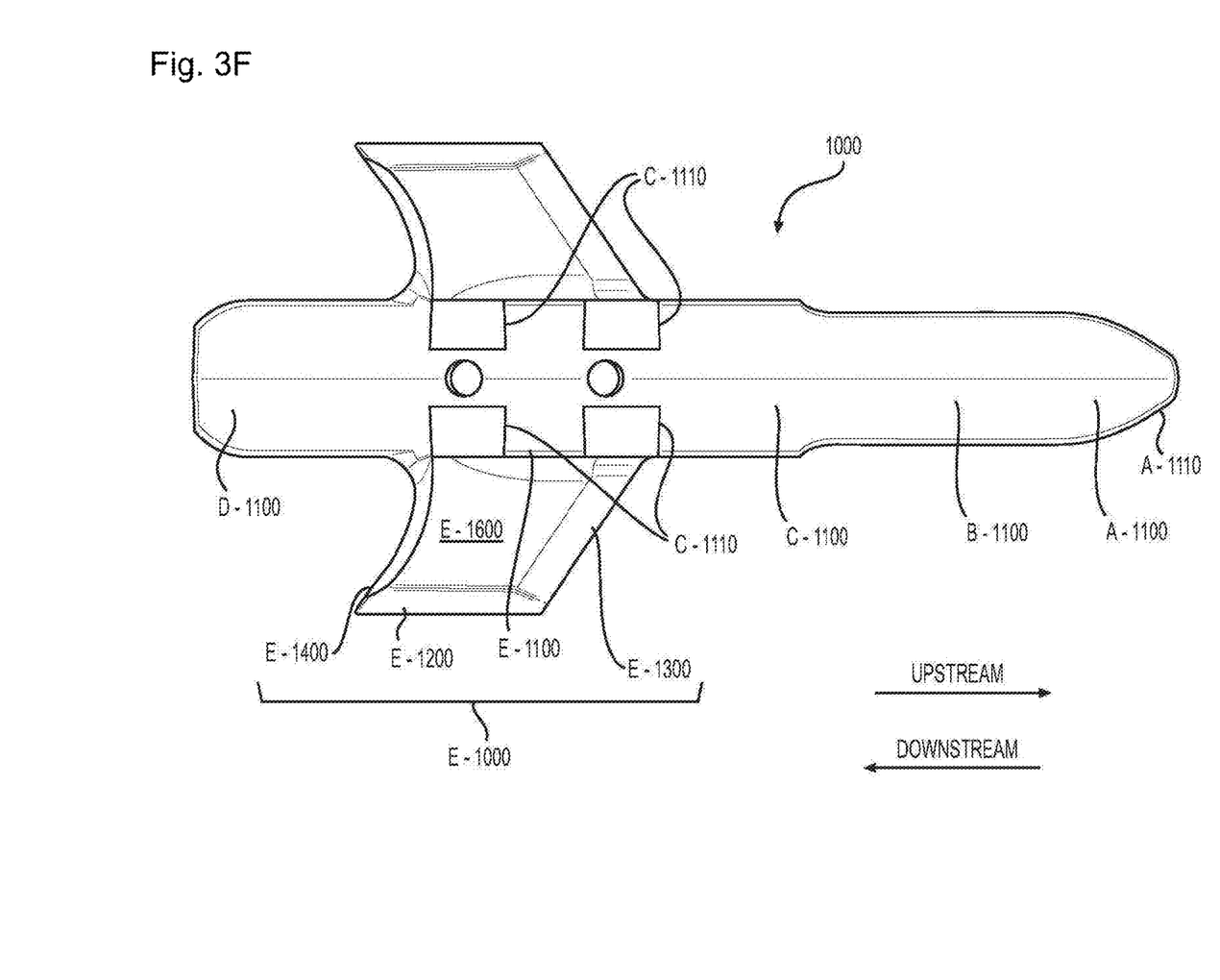
FIG. 3F is a back view of the chisel point, according to certain aspects of the disclosure.
Figure 3G:
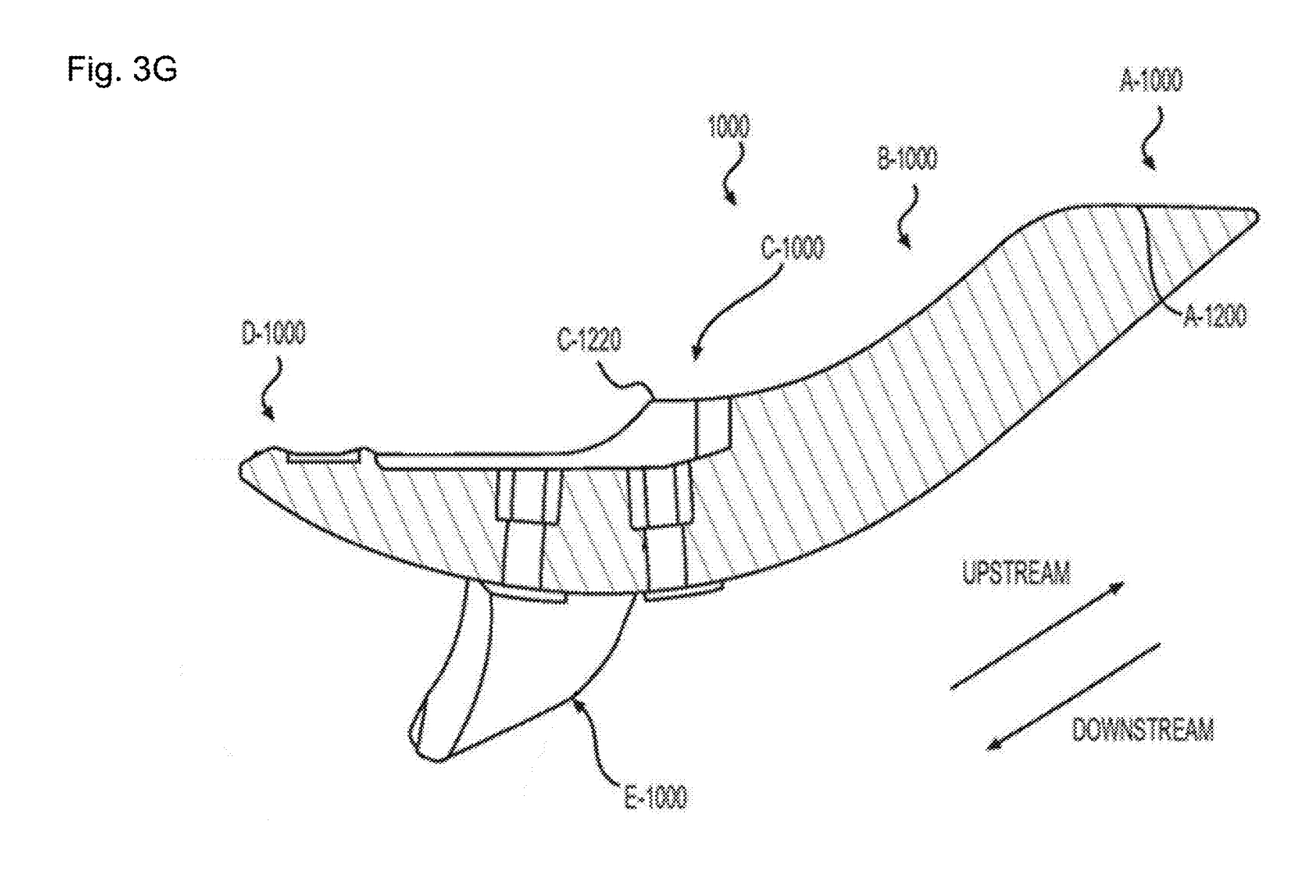
FIG. 3G is a side sectional view of the chisel point, according to certain aspects of the disclosure.

FIGS. 2A-2B are side and top views of the chisel point 1000 mounted on the shank 2000, respectively and according to certain aspect of the disclosure. These drawings are to scale.

The chisel point 1000 can extend between an upstream extremity 1010 that contacts the unprepared materials 100, a downstream extremity 1020 that contacts the shank 2000, and be substantially symmetric with respect to a central plane P passing through the upstream extremity 1010 and the downstream extremity 1020 and being substantially vertical.

As used herein, the term "upstream" refers to the region of the chisel point 1000 closest to the upstream extremity 1010, the term "downstream" refers to the region of the chisel point 1000 closest to the downstream extremity 1020, the terms "bottom" and/or "down" refer to the region of the chisel point 1000 closest to the unprepared materials 100, and the term "top" and/or "up" refer to the region of the chisel point 1000 closest to the back support member 2000.

The chisel point 1000 can include a nose A-1000 that extends in a downstream direction from the upstream extremity 1010 of chisel point 1000, a tail D-1000 that extends in an upstream direction from the downstream extremity 1020 of chisel point 1000, a head B-1000 that extends in the downstream direction from the nose A-1000, a body C-1000 that extends between the head B-1000 and the tail D-1000, and a pair of wings E-1000 that protrude radially and in the downstream direction from the body C-1000.

In addition, to enhance strength of the chisel point 1000 and prevent the different elements of the chisel point 1000, e.g., the nose A-1000, the head B-1000, the body C-1000, the tail D-1000, and/or the wings E-1000, from breaking, the chisel point 1000 can be manufactured as a one piece element via casting and be made of abrasion resistant alloys such as chromium carbide alloys.

The nose A-1000 can contact and penetrate the unprepared material 100, the head B-1000 can convey the material 100 towards the pair of wings E-1000 to provide further break down, the body C-1000 can provide support to affix the chisel point 1000 to the shank 2000, the pair of wings E-1000 can provide draft reduction and lateral penetrations of the unprepared materials 100, the tail D-1000 can provide protection for shank 2000 against abrasion and/or erosion generated by the unprepared materials 100.

FIGS. 3A-3G is a perspective, side, front, back, top, bottom, and sectional views of the chisel point 1000, respectively and according to certain aspects of the disclosure. These drawings are to scale.

The nose A-1000 can include a nose bottom surface A-1100, a nose ridge A-1200 that protrudes upwardly and in the downstream direction from the nose bottom surface A-1100, a pair of nose lateral surfaces A-1300 that extends upwardly from the nose bottom surface A-1100 and in the downstream direction from the nose ridge A-1200 to connect the body B-1000 of the chisel point 1000.

The nose bottom surface A-1100, the nose ridge A-1200, and the pair of nose lateral surfaces A-1300 provide a rounded raised surface that minimize draft by reducing contact area between the material 100 and the chisel point 1000 and that limit downstream progression of the material 100 along the chisel point 1000.

The nose ridge A-1200 can provide a raised substantially flat surface that connects the nose bottom surface A-1100 to the body B-1000 to prevent the material 100 from flowing along the nose ridge A-1200 and towards the body C-1000.

The pair of nose lateral surfaces A-1300 can be curved surfaces that follow a nose rounded peripheral edge A-1110 of the nose bottom surface A-1100 and enlarges the chisel point 1000 from the nose ridge A-1200 to the body B-1000. The pair of nose lateral surfaces A-1300 can convey the material 100 upwardly and in the downstream direction towards the body C-1000.

The head B-1000 can include a head bottom surface B-1100 that connects the nose bottom surface A-1100, a pair of head lateral grooves B-1300 that connects the nose lateral surfaces A-1300, and a head top surface B-1200 that laterally extends between the pair of head lateral grooves B-1300 and the downstream direction from the nose ridge A-1200.

The head bottom surface B-1100 can be a substantially flat surface substantia aligned with the nose bottom surface A-1100.

The pair of head lateral grooves B-1300 can extend in the downstream direction from the pair of nose lateral surfaces A-1300 along the head B-1000 and curved outwardly from the head B-1000 to move the material 100 away from the head B-1000 and towards the pair of wings E-1000.

Each head lateral groove of the pair of head lateral grooves B-1300 can include a groove upstream portion B-1310 that contacts a corresponding nose lateral surface of the pair of nose lateral surfaces A-1300, a groove downstream portion B-1330 that contacts the body C-1000 of the chisel point 1000, and a groove middle portion B-1320 that connects the groove upstream portion B-1310 to the groove downstream portion B-1330.

The groove upstream portion B-1310 can curve inwardly from the nose lateral surface A-1300 towards the central plane P with a upstream curvature radius Rf, the groove middle portion B-1320 can extend along the body and substantially parallel to the central plane P, and the groove downstream portion B-1330 can curve outwardly from the body C-1000 towards a pair of wings E-1000 with a downstream curvature radius Rb larger than the upstream curvature radius Rf. The upstream curvature radius Rf and the downstream curvature radius Rb are determined to provide full penetration of the nose A-1000 into the material 100 and partial penetration of the head B-1000 into the material 100 as well as to convey the material 100 towards the pair of wings E-1000.

The head top surface B-1200 can include a head top upstream surface B-1210 that laterally extends between the groove upstream portions B-1310, a head top downstream surface B-1230 that laterally extends between the groove downstream portions B-1330, and a head top middle surface B-1220 that laterally extends between the groove middle portions B-1320 and that extends in the downstream direction from the head top upstream surface B-1210 to the head top downstream surface B-1230.

The head top upstream surface B-1210 can narrow and curve backwardly from the nose ridge A-1200 to the head top middle surface B-1220, the head top downstream surface B-1230 can enlarge and curve upwardly from the head top middle surface B-1220 to the body C-1000, and the head top middle surface B-1220 can be substantially flat and maintain a substantially constant thickness.

The body C-1000 can include a body bottom surface C-1100 that curves upwardly from the head bottom surface B-1100 to a tail bottom surface D-1100 of the tail D-1000, body lateral surfaces C-1300 that support the pair of wings E-1000 extend between the head B-1000 and the tail D-1000, a recess C-1400 that extends from the upstream edge of wings E-1000 to the tail D-1000, and a body top surface C-1200 that extends from the head top downstream surface B-1230 to the tail D-1000 and along the pair of wings E-1000.

The body bottom surface C-1100 can follow a shank curvature of the shank 2000 to provide contact and affixing between the shank 2000 and the chisel point 1000. Furthermore, the body bottom surface C-1100 can include a plurality of mounting pads C-1110 positioned between the pair of wings E-1000 to provide a specific contact area and enhance support affixing between the radius of shank 2000 and the radius of chisel point 1000 when the two radii do not match.

The recess C-1400 can include a recess base C-1410, a recess peripheral wall C-1420 that surrounds the recess base C-1410 and connect the recess base C-1410 to the body top surface C-1200, and a pair of counter bored holes C-1500 that goes from the recess base C-1410 to the body bottom surface C-1100.

The pair of counter bored holes C-1500 can receive a pair of bolts that can affix the chisel point 1000 on the shank 2000.

The recess C-1400 can provide from the pair of bolts protection against erosion and/or abrasion generated by the material 100 that flow along the chisel point 1000 by retaining some of the material 100 inside the recess C-1400 and preventing flowing material 100 to be in contact with the pair of bolts and erode the pair of bolts.

The body top surface C-1200 can include a body top upstream surface C-1210 that extends from the head top downstream surface B-1230 to a central portion of an upstream counter bored hole of the pair of counter bored holes C-1500 and a body top downstream surface C-1230 that extends from the body top upstream surface C-1210 to the tail D-1000.

The body top upstream surface C-1210 and the body top downstream surface C-1230 can curve upwardly to form a body top edge C-1220 that further breaks down the unprepared materials 100.

The tail D-1000 can include the tail bottom surface D-1100 that extends from the body bottom surface C-1100 to the downstream extremity 1020 of the chisel point 1000, a tail top surface D-1200 that extends from the body top downstream surface C-1230 to the downstream extremity 1020 of the chisel point 1000, and tail lateral surfaces D-1300 that extend from the body lateral surfaces C-1300 to the downstream extremity 1020 of the chisel point 1000 and upwardly from the tail bottom surface D-1100 to the tail top surface D-1200.

Each wing of the pair of wings E-1000 can include a wing base E-1100, a wing tip E-1200 opposite to the wing base E-1100, a wing upstream edge E-1300 that laterally extends between the wing base E-1100 and the wing tip E-1200, a wing downstream edge E-1400 that is opposite to the wing upstream edge E-1300 and laterally extends between the wing base E-1100 and the wing tip E-1200, a wing top surface E-1500 that extends in the downstream direction from the wing upstream edge E-1300 to the wing downstream edge E-1400, and a wing bottom surface E-1600 that is opposite to the wing top surface E-1500 and extends in the downstream direction from the wing upstream edge E-1300 and the wing downstream edge E-1400.

The wing top surface E-1500 can protrude radially and in the downstream direction from the body lateral surfaces C-1300 to reduce draft generated by the material 100 while further enhancing penetration of the unprepared material 100. For example, the wing top surface E-1500 can form a first predetermined angle A1 with the central plane P and a second predetermined angle A2 with the body top surface C-1200 to have the wing tip E-1200 penetrating the material 100 and minimizing orthographic projection area of the wing E-1000 passing through the unprepared materials 100. For example, the first predetermined angle A1 can be between 35° and 45° while the second predetermined angle A2 can be between 15° and 25°.

To further reduce drag, the wing upstream edge E-1300 can be substantially straight while the wing downstream edge E-1400 can curve outwardly from the wing base E-1100.

The wing upstream edge E-1300 can be positioned substantially aligned with the pair of head lateral grooves B-1300 and positioned downstream from the pair of head lateral grooves B-1300 to receive the material 100 and further break down the material 100.

Numerous modifications and variations on the present disclosure are possible in light of the above teachings. It is therefore to be understood that within the scope of the appended claims, the disclosure may be practiced otherwise than as specifically described herein.

What is claimed is:

1. A single piece chisel point to shatter compacted soil, comprising:
   a nose that penetrates the soil;
   a tail that points in an upward direction;
   a head that extends in a downstream direction from the nose;
   a body that connects the head to the tail in a downward direction and in the upward direction; and
   a pair of wings that laterally protrudes from the body in the downstream direction and in the downward direction,
   wherein the nose includes a nose ridge that provides a substantially flat surface that protrudes in the upward direction and the downstream direction from a nose bottom surface to limit upward progression of the soil along the chisel point, and
   wherein the head includes a pair of head lateral grooves that extends in the downstream direction along the head to move the soil away from the head and towards the pair of wings.

2. The chisel point of claim 1, wherein each lateral groove of the pair of head lateral grooves includes a groove upstream portion that curves in an inward direction from the head and a groove downstream portion that curves in an outward direction from the head.

3. The chisel point of claim 2, wherein the groove upstream portion is defined by an upstream curvature radius and the groove downstream portion is defined by a downstream curvature radius greater than the upstream curvature radius.

4. The chisel point of claim 1, wherein each wing of the pair of wings includes a wing tip that penetrates the soil.

5. The chisel point of claim 1, wherein each wing of the pair of wings includes a front edge that is substantially straight and a back edge opposite to the front edge that is curved.

6. The chisel point of claim 1, wherein the body includes a body top edge formed by a body top surface of the body that further breaks down the soil.

7. The chisel point of claim 6, wherein the body top surface forms a recess to receive a pair of fasteners and to protect the pair of fasteners against soil abrasion.

8. A single piece chisel point assembly to shatter compacted soil, comprising:

a tool assembly;

a plurality of shanks affixed to the tool assembly; and a plurality of chisel points affixed to the plurality of shanks, each chisel point of the plurality of chisel point including:

a nose that penetrates the soil;

a tail that points in an upward direction;

a head that extends in a downstream direction from the nose;

a body that connects the head to the tail in a downward direction and in the upward direction; and a pair of wings that laterally protrudes from the body in the downstream direction and in the downward direction, wherein the nose includes a nose ridge that provides a substantially flat surface that protrudes in the upward direction and the downstream direction from a nose bottom surface to limit upward progression of the soil along the chisel point, and wherein the head includes a pair of head lateral grooves that extends in the downstream direction along the head to move the soil away from the head and towards the pair of wings.

9. The chisel assembly of claim 8, wherein each lateral groove of the pair of head lateral grooves includes a groove upstream portion that curves in an inward direction from the head and a groove downstream portion that curves in an outward direction from the head.

10. The chisel assembly of claim 9, wherein the groove upstream portion is characterized by an upstream curvature radius and the groove downstream portion is characterized by a downstream curvature radius greater than the upstream curvature radius.

11. The chisel assembly of claim 8, wherein each wing of the pair of wings includes a wing tip that penetrates the soil.

12. The chisel assembly of claim 8, wherein each wing of the pair of wings includes a front edge that is substantially straight and a back edge opposite to the front edge that is curved.

13. The chisel assembly of claim 8, wherein the body includes a body top edge firmed by a body top surface of the body that further breaks down the soil.

14. The chisel assembly of claim 13, wherein the body top surface forms a recess with to receive a pair of fasteners that is affixed to each shank of the plurality of shanks, and wherein the recess protects the pair of fasteners against soil abrasion.

15. The chisel assembly of claim 8, wherein the body includes a plurality of mounting pads to enhance affixing between the chisel point and the shank.

* * * * *